June 13, 1944.  P. D. MERRILL  2,351,141
SADDLE COUPLING
Filed May 15, 1941  2 Sheets-Sheet 1

INVENTOR.
PATTERSON D. MERRILL
BY Oltsch & Knoblock
Attorneys.

June 13, 1944.   P. D. MERRILL   2,351,141
SADDLE COUPLING
Filed May 15, 1941   2 Sheets-Sheet 2

INVENTOR.
PATTERSON D. MERRILL.
BY Oltsch & Knoblock
Attorneys.

Patented June 13, 1944

2,351,141

UNITED STATES PATENT OFFICE 2,351,141

SADDLE COUPLING

Patterson D. Merrill, South Bend, Ind., assignor to M. B. Skinner Company, South Bend, Ind., a corporation of Indiana Application May 15, 1941, Serial No. 393,541

4 Claims. (Cl. 285—108)

This invention relates to saddle couplings, and more particularly to a coupling adapted to be mounted upon an apertured pipe and having means for connecting a branch pipe therewith.

The primary object of the invention is to provide a saddle coupling which is easily handled, which is simple in construction, and which is comparatively inexpensive.

A further object is to provide a saddle coupling having a branch pipe connector formed integral therewith wherein the number of threads for interconnecting parts, the number of gaskets for sealing connected parts, and the time required for installation, are all reduced to a minimum.

A further object is to provide a saddle coupling with an integral branch connector wherein the walls are substantially uniform in thickness throughout to avoid shrinkage or distortion of parts when the device is cast from a malleable metal.

A further object is to provide a device of this character with a compression branch pipe connector of the type sealing the joint of a branch pipe therewith by means of a constricting gasket compressed between a rigid abutment on the connector and a compression ring, wherein said compression ring is constructed to avoid rotation thereof incident to rotation of a compression nut to avoid bunching of the body of the gasket.

A further object is to provide a device of this character having a compression fitting of the type including a gasket adapted to be compressed against a stationary abutment by a follower ring urged in compression direction by a screw threaded rotatable compressing nut, wherein the follower ring is configured to provide a restricted, substantially linear engagement between the ring and the nut so that the ring will remain stationary when the nut is rotated.

A further object is to provide a compression fitting of the type wherein a gasket ring is compressed by a follower ring urged in compressing direction by a rotatable compressing member, wherein a bearing member is interposed between said follower ring and compressing member to minimize the rotative torque applied by the compressing member to the follower ring and gasket.

A further object is to provide a device of this character having an annular guide of novel construction for guiding a drill within the drill tube.

A further object is to provide a device of this character having a drill tube provided with an annular guide of stepped cross sectional shape wherein the step of smallest dimension is thin in cross section and may be cut away by a drill of intermediate size.

Other objects will be apparent from the drawings, description, and appended claims.

Figure 1:
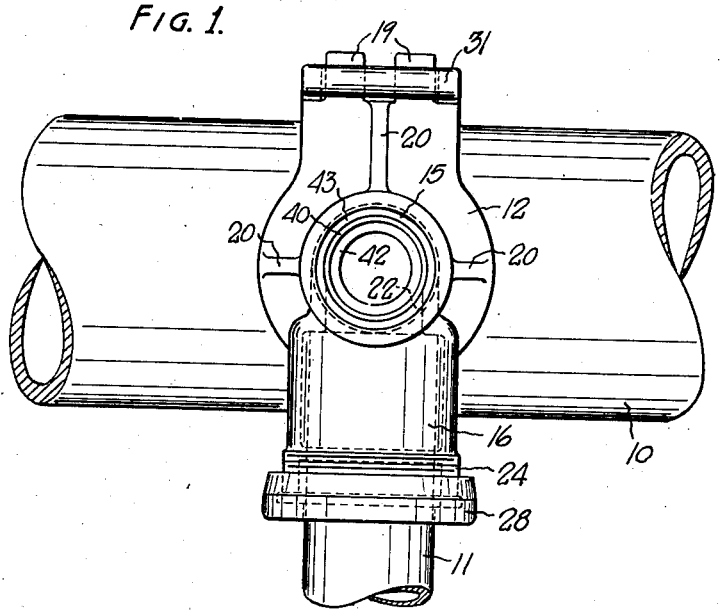
Fig. 1 is a top plan view of the coupling mounted upon a main and connected with a branch pipe.
Figure 2:
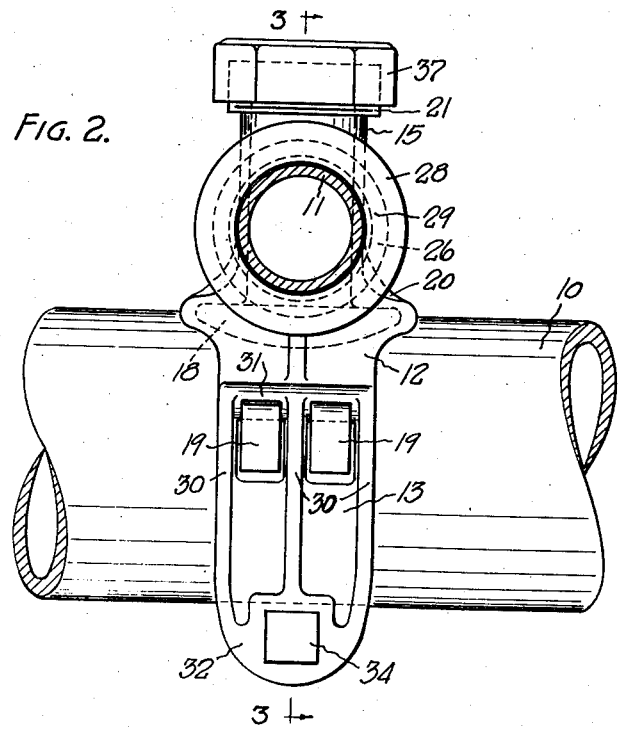
Fig. 2 is a view of the coupling in side elevation.
Figure 4:
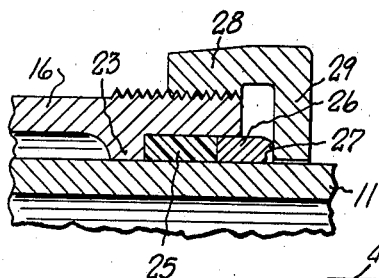
Fig. 4 is an enlarged fragmentary detail sectional view illustrating the construction of the compression fitting.

Referring to the drawings, which illustrate the preferred embodiment of the invention, the number 10 designates a main having an opening 10' therein, and the numeral 11 designates a branch pipe which is to be connected in communication with the main through the opening 10'.

My improved device comprises a saddle portion 12, connecting links 13, drawbolt 14, drill tube 15, and branch connector 16.

The saddle 12 comprises a plate curved in substantially semi-circular arcuate shape and provided with a recess 17 at the center of its concave face for the reception of an annular gasket 18, adapted to bear against the pipe 10 around the opening 10' to seal the joint between the saddle and the pipe. Saddle plate 12 has a pair of hooks 19 formed at each end thereof.

Drill tube 15 is formed integrally with saddle plate 12 and projects from the center of the convex side thereof in axial alignment with pipe opening 10'.

Reinforcing ribs 20 are formed between the saddle plate 12 and drill tube 15. The upper end of drill tube 15 is preferably enlarged at 21 and is externally screw threaded.

Branch connector 16 is formed integrally with drill tube 15 and preferably extends perpendicularly to drill tube 15 at a point intermediate the height thereof. An opening 22 in drill tube 15 serves to connect the bores of the drill tube and the branch connector. Branch connector 16 is of an inner diameter substantially larger than the outer dimension of branch pipe 11, and the opening 22 is preferably of a diameter substantially equal to the inner diameter of branch pipe 11. An annular internally projecting rib 23 is provided in the branch connector 16 in spaced relation to the outer end thereof. The outer end portion of the branch connector is externally screw threaded at 24 and has a smooth inner bore.

A gasket ring 25 is adapted to fit snugly around the branch pipe 11 and within the bore of the outer end of the branch connector with its inner edge abutting the interior rib 23. A follower ring 26 of a thickness substantially equal to the spacing between the outer circumference of branch pipe 11 and the inner circumference of branch connector 16 fits into the outer end of the branch connector in engagement with the outer edge of gasket 25. The outer edge of follower ring 26 may be provided with a narrow annular projecting rib 27 positioned intermediate the inner and outer circumferences of said ring. A compression nut 28 is screw threaded upon the outer end of the branch connector at 24 and has an apertured end wall 29 adapted to bear against the rib 27 on the follower ring 26. The diameter of the aperture in the end 29 of the compression nut is preferably greater than the external diameter of branch pipe 11. The internal diameter of the rib 23 on the branch is preferably of a diameter to provide a snug sliding fit between the same and the branch connector 11.

The connecting links 13 of the device comprise arcuate plates from which project arms 30 extending upwardly and outwardly, with their outer ends being connected by cylindrical cross pieces 31 adapted to seat at the hooks 19. The opposite ends of the connecting links 13 are provided with lugs 32 apertured at 33 to receive the shank of drawbolt 14. The head 34 of the drawbolt seats against one of the projecting lugs 32 and a nut 35 threaded on belt 14 bears against the outer end of the opposite lug 32.

Throughout the construction, it is desirable that the thickness of the parts such as the saddle plate 12, the walls of drill tube 15, the walls of branch connector 16, and walls of connecting links 13, shall be of substantially uniform thickness. This facilitates casting of the device from malleable metal without danger of shrinking or distortion of the castings as is common when castings having irregular and widely varying thicknesses are cast from malleable metal.

The use of the device is as follows: The saddle 12 is mounted upon the main 10 at the desired location, and the links 13 are hooked thereon by engagement of cross pieces 31 with hooks 19. Drawbolt 14 is then inserted through apertures 33 of lugs 32 of the connecting links 13, and nut 35 is tightened. As nut 35 is tightened, the connecting links 13 are drawn together and pull equally on the opposite ends of the saddle plate 12 to uniformly compress the gasket ring 18 throughout its full extent. Hence, a uniform tight seal is provided between the saddle plate 12 and the main 10. This uniform gasket compression coupled with the recessed positioning of gasket 18, provides an efficient seal with minimum application of torque and stress upon the device.

Branch pipe 11 is then inserted in the branch connector 16 with its inner end bearing against shoulder 36 thereof. A tight sealed joint between the branch connector and the branch pipe is effected by compression of gasket 25 in the annular socket defined by the bore of the branch connector, the outer wall of rib 23 of the branch connector, the outer surface of branch pipe 11, and the inner edge of follower ring 26. It will be observed that as the compression nut 28 is tightened, the follower ring 26 will be urged thereby against gasket 25 in a direction longitudinally of branch pipe 12 for the purpose of compressing the gasket 25 between said ring 26 and the rib 23. This insures a tight or constrictive annular sealing fit of the gasket about the branch pipe 11. The provision of the small annular projecting rib 27 upon outer end of follower ring 26 is of particular importance in this construction. Note that this rib limits the area of contact between the follower ring 26 and the end wall 29 of the compression nut so that said area is much smaller than the area of the contact between the ring and the gasket. Consequently, rib 27 forms a bearing upon which the rotating wall 29 of the compression nut 28 can apply only a comparatively small rotative force, which is insufficient to overcome the frictional engagement between the inner face of follower ring 26 and the gasket, so that ring 26 will not rotate with nut 28 and will apply to the gasket 25 only an axial or compressing force. This is a distinct improvement over previous constructions wherein frictional engagement between the compression nut and the follower ring is substantially equal to that between the follower ring and the gasket, so that there is a tendency on the part of the follower ring to rotate with the compression nut and hence to apply a twisting action to the gasket which bunches, twists, or otherwise distorts and damages the gasket ring.

Figure 5:
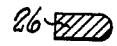
Fig. 5 is a cross sectional view of a modified embodiment of the follower ring of the compression fitting.

An alternative embodiment of the follower ring 26 is illustrated in Fig. 5, wherein the body of the ring is of substantially rectangular cross section with the exception that one end thereof is of arcuate formation. In this embodiment, the contact between the ring 26 and the wall 29 of the compression nut occurs at the median diameter of the follower ring and is of restricted and substantially linear character, and hence affords the same advantages as more particularly described above in reference to the provision of ring 26 with the rib 27.

When the saddle 12 has been rigidly mounted upon the main pipe 10, and the branch pipe 11 has been connected with the branch connector 16 by means of the compression fitting, any suitable drilling device (not shown) may be mounted upon the drill tube 15 at the screw threaded enlarged portion 21 thereof for the purpose of drilling the hole 10′ in the main 10 in axial alignment with said drill tube 15. Thereupon, the drilling device is withdrawn, and a sealing cap 37 may be screw threaded upon end 21 of the drill tube, and the device is ready for service.

Figure 3:
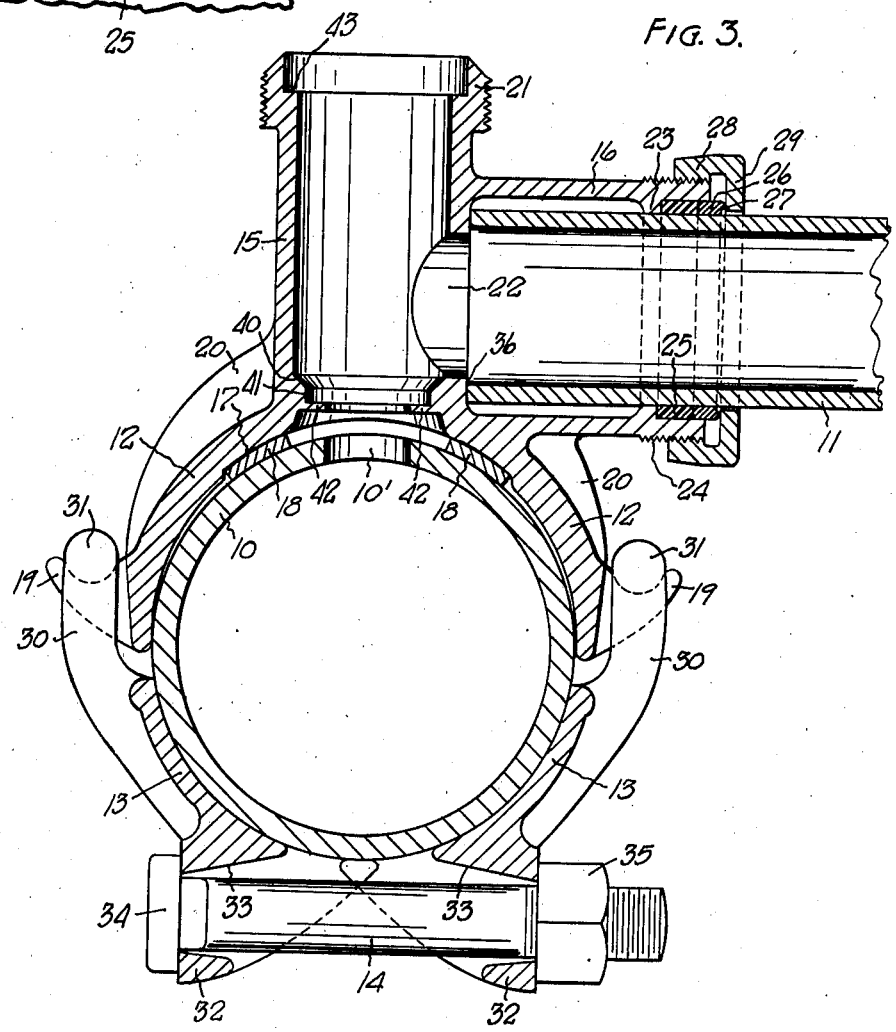
Fig. 3 is an enlarged sectional view of the coupling taken on line 3—3 of Fig. 2.

In the drilling operation, it is desirable that some means be provided for guiding the drill adjacent the pipe 10, so that vibration of the drill is avoided and an accurate drilling operation is achieved. This is particularly important where the drill constitutes an annular cutter of the type well known in the art. A guide particularly adapted for this drilling operation is illustrated in Fig. 3 at the lower end of tube 15. This guide comprises an inwardly tapered surface 40, a short cylindrical surface 41, and a thin inwardly projecting annular guide plate 42. This guide construction 40—41—42 is positioned between the lower portion of opening 22 in the tube and the contour of the recess 17. The guide construction is of particular value and importance by reason of the fact that it permits guiding of a drill to form a small opening, as may be desired in a line under high pressure, or a large opening in a low pressure line. As illustrated in Fig. 3, the hole 10′ drilled in the pipe 10 is of small size substantially equal to the size of the opening in the web or plate portion 42 of the guide. However, where a low pressure condition exists the cutter used may be substantially the same diameter as the diameter of the portion 41 of the guide, so that the same will be guided by portion 41 during an initial drilling operation drilling away the plate or web 42 and then during drilling of the pipe 10 in the same drilling operation. The web 42, being of thin section, may be easily and quickly drilled, without destroying its value as a guide for a small drill for tapping a high pressure main.

The upper end of the drilling tube 15 may be provided with an enlarged bore 43 to provide a seat for a self closing flap valve of any desired construction and of a character to permit the drilling tool to be inserted therethrough during the drilling operation, and to close automatically as soon as drilling tool is removed.

I claim:

1. In saddle coupling, a saddle plate adapted to seat against a pipe, a drill tube integral with said saddle plate, and a branch connector tube integral with and branching from said drill tube, said drill tube having an integral drill guide therein between said connector tube and said plate and spaced from the concave face of said plate, said guide comprising an annular reduced diameter portion of short longitudinally stepped formation.

2. In a pipe coupling having a drill tube adapted to receive a drill for tapping the pipe on which the coupling is mounted, a drill guide within said tube in adjacent spaced relation to the inner end thereof, said guide being longitudinally stepped and comprising an annular portion having an inner diameter less than that of said tube and a thin annular web of a second and smaller inner diameter.

3. The combination with a pipe coupling having a drill tube adapted to receive a drill for tapping the pipe on which the coupling is mounted, of an annular drill guide within said tube at its inner end and having a portion of a restricted inner diameter adapted to receive a drill of one size, and a thin annular web projecting from the inner end of said first portion and of a smaller inner diameter adapted to receive a second drill of smaller size.

4. In a pipe coupling having a drill tube adapted to receive a drill for tapping the pipe on which the coupling is mounted, a concentric annular drill guide portion integral with said tube adjacent the inner end thereof and having a reduced diameter bore to receive and guide a large drill rotatable in said tube, and a second concentric annular guide portion adjacent said first guide portion and having a smaller drill-guiding bore and a thin longitudinal cross-section.

PATTERSON D. MERRILL.